United States Patent [19]

Podszün et al.

[11] Patent Number: 4,599,291

[45] Date of Patent: Jul. 8, 1986

[54] ELECTROSTATOGRAPHIC SUSPENSION DEVELOPER OF BLOCK COPOLYMER REACTED WITH MERCAPTAN

[75] Inventors: Wolfgang Podszün; Josef Witte, both of Cologne, Fed. Rep. of Germany; Herman Uytterhoeven, Bonheiden, Belgium; John Goossens, Cologne, Fed. Rep. of Germany

[73] Assignee: Agfa-Gevaert Aktiengesellschaft, Leverkusen-Bayerwerk, Fed. Rep. of Germany

[21] Appl. No.: 714,025

[22] Filed: Mar. 20, 1985

[30] Foreign Application Priority Data

Mar. 31, 1984 [DE] Fed. Rep. of Germany ....... 3412085

[51] Int. Cl.⁴ .............................................. G03G 9/12
[52] U.S. Cl. ..................................... 430/114; 430/115
[58] Field of Search ................................. 430/114, 115

[56] References Cited

U.S. PATENT DOCUMENTS 3,900,412  8/1975  Kosel .................................... 430/114

OTHER PUBLICATIONS

Merrill et al., "Liquid Electrographic Developers", Research Discl., 14337, Mar. 1976.

*Primary Examiner*—Roland E. Martin
*Attorney, Agent, or Firm*—Connolly and Hutz

[57] ABSTRACT

The suspension developer contains, in an electrically-insulating carrier liquid, a pigment and a block copolymer comprising a block of polymerized vinylaromatic compounds and a block of polymerized dienes the double bonds of which have been partially or completely reacted with alkyl mercaptans. The developer is distinguished by its high dispersion stability, small particle size and uniform particle size distribution.

7 Claims, No Drawings

ELECTROSTATOGRAPHIC SUSPENSION DEVELOPER OF BLOCK COPOLYMER REACTED WITH MERCAPTAN

This invention relates to an improved electrostatographic suspension developer containing a block copolymer.

Both dry and wet development processes are known for developing electrostatic images on electrostatographic recording materials. The wet development processes using suspension developers are superior to the dry development processes in the power of resolution and marginal definition obtained.

Suspension developers generally consist of a highly insulating carrier liquid, a pigment, a charge determining substance (also known as control substance) and a polymer. The carrier liquid preferably has a volumetric resistance of at least $10^9$ ohm cm and a dielectric constant below 3. The pigments used may be, for example, the conventional azo dyes, xanthene dyes or phthalocyanine dyes described inter alia in DE-OS No. 2,944,021 or triphenyl methane dyes, acridine dyes or quinoline dyes. The black pigments used are preferably carbon black pigments.

The charge of the toner particles may be produced by oil-soluble ionogenic compounds e.g. metal salts of organic acids with long aliphatic groups. Thus, for example, carbon black pigments may be positively charged in liquid isoparaffin by means of organic phosphorus compounds (GB-PS No. 1,151,141). A negative build up of charge may be obtained by the addition of basic metal alkyl sulphonate (GB-PS No. 1,571,401). The amount of charge is generally controlled by the concentration of the charge-determining substance.

The polymer has the function of imparting sufficient stabilization to the pigment dispersion and ensuring that the pigment particles will adhere to or be fixed on the image carrier.

Numerous polymers with differing structures may be used as components of electrostatographic suspension developers. The use of statistical copolymers built up of less strongly polar monomers ($C_6$–$C_{20}$ alkyl(meth)acrylate) and more highly polar monomers (e.g. aminomethacrylates, vinyl pyrrolidone) has been repeatedly described (DE-OS No. 1,927,592, DE-OS No. 1,938,001, BE-PS No. 784,367, JP-N No. 49,128,539, JP-N No. 73,431,54). Styrene-butadiene copolymers may also be used (DE-OS No. 2,337,419, DE-OS No. 2,452,499, JP-N No. 73 290 72).

Various types of graft copolymers have also been used for producing suspension developers (DE-OS No. 2,042,804, DE-OS No. 2,103,045, DE-OS No. 2,421,037, DE-OS No. 2,532,281, DE-OS No. 2,432,288, DE-OS No. 2,935,287, GB-PS No. 2 157 2343, GB-PS No. 2,029,049, U.S. Pat. No. 4,033,890).

The use of block copolymers for steric stabilization of dispersions is described in GB-PS No. 1,186,562 and in "Advances in Colloid and Interface Science", 4, 193–277, (1974). A-B block copolymers wherein the polymer moiety A is insoluble in the dispersion medium and has a strong affinity for the surface of the particles and the polymer moiety B is readily soluble in the dispersion medium and has little or no affinity for the surface of the particles are particularly suitable.

When the block polymers used are of the type A-B wherein A is a polystyrene block and B a polybutadiene block, the dispersions obtained are stable, but the particle sizes are disadvantageously large.

It is an object of the present invention to provide an electrostatographic suspension developer which combines high dispersion stability with small grain size and uniform grain distribution and is free from agglomerates.

The problem is solved according to the present invention by an electrostatographic suspension developer containing, in an electrically-insulating carrier liquid having a volumetric resistance of at least $10^9$ ohm.cm and a dielectric constant below 3, a dispersed pigment, a block copolymer, which suspension developer is characterized in that the block copolymer comprises (a) a block of polymerized vinylaromatic compounds and (b) a block of polymerized $C_4$–$C_6$-dienes, wherein the vinyl double bonds are completely or partially reacted with alkyl mercaptans.

Suitable vinyl aromatic compounds are styrene and substituted styrenes, e.g. α-methylstyrene, 4-methylstyrene and 3-methylstyrene and derivatives of naphthaline, e.g. vinylnaphthaline or isopropenylnaphthalene. Especially preferred is styrene. Preferred dienes are isoprene, dimethylbutadiene, ethylbutadiene and especially butadiene.

A preferred block copolymer comprises (a) a polystyrene block and (b) a polybutadiene block wherein the double bonds are completely or partially reacted with alkyl mercaptans. In an especially preferred embodiment the block copolymer consists of said blocks.

For preparing the block copolymers modified with alkyl mercaptans and used according to the present invention, it is suitable to use diene-vinylaromatic block copolymers, especially butadiene-styrene block polymers which have a mass content of diene, especially butadiene of from 20 to 80%, preferably from 40 to 80% and most preferably from 50 to 75%. The polymerized diene block, especially polybutadiene block contains from 25 to 95%, preferably from 40 to 80%, of vinyl double bonds based on the total number of olefinic double bonds. The molar masses of the block polymers used for the reaction with alkyl mercaptans should be from $10^3$ to $5 \times 10^5$ g/mol, preferably from $1 \times 10^4$ to $1 \times 10^5$ g/mol. Such block polymers are preferably prepared by anionic polymerisation with the aid of alkyl lithium compounds, as will be exemplified below. The conventional donors, such as ethers or tertiary amines, can be used for regulating the proportion of vinyl double bonds, e.g. tetrahydrofuran, glycol dimethyl ethers or tetramethyl ethylene diamine.

Optionally additional other polymerized units, preferably up to 20% by mass, may be present. Such additional units can be obtained by polymerization of e.g. acrylonitrile methacrylonitrile, acrylic acid esters, methacrylic acid esters e.g. ε-butylmethacrylate.

The reaction of the block polymers according to the invention with alkyl mercaptans is preferably carried out in a hydrocarbon solution in the presence of radical-formers. Suitable mercaptans are those which contain straight- or branched-chain alkyl groups having from 4 to 20 carbon atoms, e.g. n-butyl mercaptan, 2-ethylhexyl mercaptan or n-dodecyl mercaptan. Mercaptans having from 8 to 20 carbon atoms in the alkyl group are preferred.

The radical formers used may be peroxides, e.g. dicyclohexyl percarbonate, tertiary butyl perpivalate or dilauroyl peroxide, or azo compounds, such as azo diisobutyronitrile.

The solvents used may be hydrocarbons, such as butane, hexane, heptane or isooctane, although aromatic or cycloaliphatic hydrocarbons, such as toluene, cyclohexane or methyl cyclopentane, or mixtures thereof, are preferred.

The quantity of alkyl mercaptan used in this reaction is calculated to provide for the reaction of preferably from 5 to 100% of the vinyl double bonds of the polybutadiene block, the proportion of vinyl double bonds undergoing reaction being most preferably from 10 to 75%.

To prepare the suspension developer according to the present invention, the block copolymer is preferably used in quantities of from 6 to 100%, by weight, most preferably from 10 to 50%, by weight, based on the pigment.

In a preferred embodiment control substances may be used for regulating the electric charge on the toner particles in the suspension developers according to the present invention. These control substances may be, for example, oil-soluble ionogenic compounds, such as metal salts of long-chained organic acids. If desired, mixtures of various control substances may be used, e.g. a mixture of different control substances which have opposite charging effects so that the strength of the charge on the toner or its polarity may be adjusted by altering the proportions in which the two control substances are mixed. (GB-PS Nos. 1,411,287; 1,411,537 and 1,411,739). Particularly suitable positively-acting control substances are described in GB-PS No. 1,151,141. These control substances are di- or tri-valent metal salts of an oxyacid which is derived from phosphorus and contains an organic group, in particular zinc, copper, cadmium, aluminium or iron salts of:

(a) a mono- or di-ester of an oxyacid derived from phosphorus;

(b) an oxyacid derived from phosphorus, containing one or two organic groups attached to the phosphorus by a carbon atom; or (c) an oxyacid derived from phosphorus, containing an ester group and an organic group which is attached to the phosphorus by a carbon atom, which organic group may be aliphatic, cycloaliphatic or aromatic.

The organic group preferably contains a chain of at least 4 carbon atoms, in particular from 10 to 18 carbon atoms, and may be substituted by one or more heteroatoms and/or be interrupted, e.g. by oxygen, sulphur or nitrogen.

Particularly advantageous results are obtained with zinc salts although other salts may also be used, e.g. salts of magnesium, calcium, strontium, barium, iron, cobalt, nickel, copper, cadmium, aluminium or lead.

The solubility of the metal salts described above in the electrically-insulating carrier liquid may be promoted by one or more organic groups having a branched chain structure, e.g. branched-chain aliphatic groups, such as a 2-butyloctyl group.

Other suitable positively-acting charge control substances may contain a metal alkyl sulphonate in which the metal ion may be one of the divalent metal ions, zinc(II), lead(II), cadmium(II), or copper(II), or a trivalent metal ion from the Eighth Group of the Periodic Table, e.g. iron(III), or from Group VIB, e.g. chromium(III), and the sulphonate group is directly attached to an unbranched alkyl chain having at least 6 carbon atoms.

The control substance may either be added to the concentrate of the suspension developer or it may be added in the course of dilution of the developer to the desired use concentration. The most suitable quantity may easily be determined by simple tests.

Zinc-mono-)2-butyl)-octyl phosphate is a preferred control substance.

Although the suspension developers according to the present invention have sufficient power of adherence when used on their own, so-called fixatives may be incorporated in the developer if the suspension developers are to be used for particular purposes, e.g. for developing charge images on electrophotographic layers of binder. The fixatives used may be resins, which should be compatible with the binder of the photoconductive recording material, e.g. with the binder of a photoconductive zinc oxide layer, so that the image produced will adhere firmly to its support after development. Examples of suitable resins include esters of hydrogenated colophony and fatty oil lacquer (so-called long-oil), colophony-modified phenol/formaldehyde resin, pentaerythritol esters of colophony, glyceric esters of hydrogenated colophony, ethyl cellulose, various alkyd resins, polyacrylic and polymethacrylic resin, polystyrene, polyketone resin and polyvinyl acetate. Specific examples of such resins may be found in the literature dealing with electrostatographic suspension developers, e.g. in BE-PS No. 699,157 and GB-PS No. 1,151,141.

The suspension developers according to the present invention may be prepared by the conventional methods of dispersion. Satisfactory results are obtained with the aid of the ball mills, bead mills, colloid mills and high speed stirrers. A toner concentrate of carrier liquid, pigment and polymer having a solids content of from 5 to 50%, by weight, preferably from 10 to 25%, by weight, may first be prepared, and this may then be diluted to suitable use concentrations of from 0.05 to 2%, preferably from 0.1 to 1%, by the further addition of carrier liquid.

The block copolymers used according to the present invention may be applied to the pigment by a preliminary treatment, e.g. by melting it or by precipitation from solutions. Alternatively, the block copolymers may be added to the carrier liquid from which it is then adsorbed by the pigment.

The synthesis of block copolymers modified with alkyl mercaptans and the preparation of suspension developers according to the present invention are described in detail in the following Examples.

EXAMPLE 1

Preparation of a butadiene-styrene block copolymer modified with alkyl mercaptan 1,000 ml of cyclohexane, 5 ml of glycol dimethyl ether and 50 g of styrene are introduced into a 2-liter glass autoclave with the exclusion of water and oxygen. The mixture is carefully titrated with a 1 molar n-butyl lithium solution in n-hexane until a pale yellow colour is obtained. 3 ml of the 1 molar butyl lithium solution are then added. The polymerisation temperature is maintained at 40° C. by external cooling. After a reaction time of 60 minutes, 50 g of butadiene are added and polymerisation is carried out for 60 minutes at 50° C. Conversion is complete by the end of that time. 48 ml of n-dodecyl mercaptan and 0.5 g of azodiisobutyronitrile are added and the reaction mixture if heated to 80° C. for 5 hours. After cooling to room temperature, the block copolymer is precipitated from the cyclohexane solution by the addition of 2,000 ml of ethanol to which 2 g of 2,6-di-tertiary butyl-p-methyl phenol have been added and the precipitate is dried to constant weight under vacuum. 140 g of a colourless block copolymer are obtained. $[\eta]=0.272$ dl/g, toluene, 25° C.; 4.5%, by weight, sulphur in the polymer.

EXAMPLE 2

Preparation of the pigment dispersion 20 parts of carbon black pigment, 0.5–5 parts (2.5 to 25%, by weight, based on the pigment) of the block copolymer from Example 1 and 80 parts of isododecane are mixed for 15 hours in a steel ball mill. The particle sizes are measured by laser scattered light spectroscopy. The carbon black pigment used has the following characteristics:

Origin: furnace soot
Density: 1.8 g/cm$^{-3}$
Particle size before introduction into the developer: 51 nm
Oil number (quantity of linseed oil, expressed in g, adsorbed by 100 g of pigments): 250
Specific surface area: 31 m$^2$/g
Volatile material in %, by weight: 2
pH: 8
Colour: Blue-black.

| Sample | Block copolymer from Example 1 in %, by weight, based on pigment | Particle diameter in nm | C |
|---|---|---|---|
| A | 2.5 | 1.413 | 0.52 |
| B | 5 | 1.250 | 0.44 |
| C | 10 | 326 | 0.26 |
| D | 15 | 299 | 0.20 |
| E | 20 | 317 | 0.06 |
| F | 25 | 369 | 0.06 |

The symbol "C" in the Table represents the second cumulant divided by the square of the first cumulant from cumulant analysis of the autocorrelation function of the scattered laser light (Koppel, D. E., J. Chem. Phys., 57, 11, (1972), 4814–4820) and is a measure of the width of distribution band of the particle size distribution. The smaller the value for C, the less polydisperse is the dispersion. The C values of samples E and F correspond to values found for almost monodisperse latex dispersions.

The Table shows that in this case, a sufficiently small particle size for a satisfactory power of resolution of the developer is obtained with about 10%, by weight, of the block copolymer, based on the quantity of pigment.

EXAMPLE 3

From 0.5 to 1%, by weight, of zinc-mono-(2-butyl-)octyl phosphate (ZOP), based on the quantity of pigment, are added as charge-determining substance to samples C and E from Example 2. After dilution of the dispersions with isododecane to 1%, by weight, of pigment, the relevant data for electrophoretic development are determined by the method of Kohler (Photographic Science and Engineering, 22, 4, (1978), 218–227).

| Experiment No. | ZOP (%, by weight) | $X_E$ (Ohm$^{-1}$m$^{-1}$) | $X_M$ (Ohm$^{-1}$m$^{-1}$) | $\mu$ (m$^2$V$^{-1}$s$^{-1}$) | q/m As kg$^{-1}$ |
|---|---|---|---|---|---|
| C | — | 3.3 10$^{-11}$ | | | |
| C | 0.5 | 6.5 10$^{-9}$ | 4.4 10$^{-9}$ | 2.9 10$^{-8}$ | +7 10$^{-3}$ |
| C | 1.0 | 1.3 10$^{-8}$ | 1.1 10$^{-8}$ | 4.7 10$^{-8}$ | +5 10$^{-3}$ |
| E | — | 1.0 10$^{-10}$ | | | |
| E | 0.5 | 6.2 10$^{-9}$ | 4.0 10$^{-9}$ | 2.9 10$^{-8}$ | +7 10$^{-3}$ |

$X_E$ is the conductivity of the whole developer, $X_m$ the conductivity of the liquid phase of the developer after removal of the pigment particles by centrifuging, $\mu$ the electrophorectic mobility of the pigment particles and q/m the charge per unit weight of toner particles. Without the addition of the charge-determining substance to the developer, the values for $\mu$ and q/m are too small to be determined. After addition of the ZOP, the particles have a distinct positive charge (+q/m) and may readily be deposited on a negative-charged polyester foil.

EXAMPLE 4

Preparation of a modified styrene-butadiene block copolymer

The procedure is the same as in Example 1, except that the quantity of 1 molar n-butyl lithium solution in n-hexane added after titration is 5 ml, not 3 ml.

EXAMPLE 5

Preparation of a modified styrene-butadiene block polymer

The procedure is the same as in Example 1, except that 63 ml of n-dodecyl mercaptan are used for modifying the block polymer.

EXAMPLE 6

Preparation of a pigment dispersion 1 g of the block copolymer prepared according to Example 4 is dissolved in 50 ml of isododecane. This solution and 4 g of carbon black pigment are together ground in a ball mill for 15 hours.

A fine, stable pigment dispersion is obtained, the particle diameter of the dispersed particles being approximately 230 nm. The addition of 1%, by weight, of ZOP, based on the quantity of pigment, results in a positively-charged suspension developer with high power of resolution and excellent dispersion stability.

EXAMPLE 7

Preparation of a pigment dispersion

A dispersion of carbon black pigment in isododecane is prepared as in Example 5, using the block copolymer prepared according to Example 5.

A very fine, stable pigment dispersion is obtained. The particle diameter is approximately 120 nm. The average diameter of the toner particles was determined by means of a laser scattered light spectrometer.

The measurements employed in this apparatus are based on the principle of Brownian motion and the auto-correlation spectroscopy of scattered laser light. The frequency of this Brownian motion is always in inverse relationship to the particle size.

The suspension developer prepared by the addition of 1%, by weight, of ZOP, based on the quantity of pigment, is perfectly satisfactory in its power of resolution and dispersion stability for use in automatic copiers.

EXAMPLE 8

(Comparison Example)

Preparation of a pigment dispersion of the type described in GB-PS No. 1,186,562, using styrene-butadiene block polymer which has *not* been modified with alkyl mercaptan 1 g of block polymer obtained from equal parts, by weight, of styrene and butadiene and having a molar mass of $1.6 \times 10^4$ is ground in a ball mill with 4 g of carbon black pigment and 50 ml of isododecane for 15 hours. A coarse-particle dispersion is obtained. (Particle size $> 1$ μm).

1 g of block polymer from 38 parts, by weight, of styrene and 62 parts, by weight, of butadiene, having a molar mass of $1.3 \times 10^4$, is dissolved in 50 ml of isododecane. This solution, together with 4 g of carbon black pigment, is ground for 15 hours. In the pigment dispersion obtained, the average particle diameter of the dispersed particles is 910 nm.

The suspension developers obtained after the addition of 1%, by weight, of ZOP, based on the quantity of pigment, have a strong tendency to sedimentation and the images obtained are moderately toned with insufficient power of resolution.

We claim:

1. Electrostatographic suspension developer containing, in an electrically-insulating carrier liquid having a volumetric resistance of at least $10^9$ Ohm.cm and a dielectric constant below 3, a dispersed pigment, and from 10-50% by weight based on the quantity of pigment of a block copolymer, comprised of:
   (a) a block of polymerized vinylaromatic compounds and
   (b) a block of polymerized $C_4$-$C_6$-dienes, wherein the vinyl double bonds are completely or partially reacted with alkyl mercaptans.

2. Suspension developer according to claim 1, wherein the block copolymer comprises
   (a) a polystyrene block; and
   (b) a polybutadiene block wherein the vinyl double bonds are partially or completely reacted with alkyl mercaptans.

3. Suspension developer according to claim 1, characterised in that the mass proportion of diene in the block copolymer which is reacted with alkyl mercaptans is from 20 to 80%, the polydiene block contains from 25 to 95% of vinyl double bonds and the molar mass of the block copolymer on which the reaction with alkyl mercaptans is based amounts to $10^3$ to $5 \times 10^5$ g/mol.

4. Suspension developer according to claims 1 and 2, characterised in that from 5 to 100% of the vinyl double bonds of the polybutadiene block are reacted with alkyl mercaptans.

5. Suspension developer according to claim 4, characterised in that the alkyl mercaptans contain a straight- or branched-chain alkyl group having 4 to 20 carbon atoms.

6. Suspension developer according to claim 1, characterised in that it contains a control substance for regulating the electric charge.

7. Suspension developer according to claim 6, characterised in that it contains zinc-mono-(2-butyl)octyl phosphate.

* * * * *